(12) United States Patent
Zengguang et al.

(10) Patent No.: US 6,678,999 B2
(45) Date of Patent: Jan. 20, 2004

(54) OBJECT SENSING SYSTEM FOR USE WITH AUTOMATIC SWING DOOR

(75) Inventors: Ye Zengguang, Kobe (JP); Shigeaki Sasaki, Kobe (JP)

(73) Assignee: Nabco Limited, Kobe (JP)

( * ) Notice: Subject to any disclaimer, the term of this patent is extended or adjusted under 35 U.S.C. 154(b) by 80 days.

(21) Appl. No.: 09/963,319

(22) Filed: Sep. 26, 2001

(65) Prior Publication Data

US 2002/0036476 A1 Mar. 28, 2002

(30) Foreign Application Priority Data

Sep. 28, 2000 (JP) .......................... 2000-296814
Oct. 4, 2000 (JP) .......................... 2000-304518

(51) Int. Cl.$^7$ .............................. E05F 15/20
(52) U.S. Cl. ........................................ 49/25
(58) Field of Search ............................. 49/25, 324

(56) References Cited

U.S. PATENT DOCUMENTS

| | | | | | |
|---|---|---|---|---|---|
| 4,733,081 A | * | 3/1988 | Mizukami | .................... | 49/25 |
| 4,967,083 A | * | 10/1990 | Kornbrekke et al. | ............ | 49/25 |
| 5,142,152 A | * | 8/1992 | Boiucaner | ...................... | 49/25 |
| 5,886,307 A | * | 3/1999 | Full et al. | ........................ | 49/25 |
| 5,963,000 A | * | 10/1999 | Tsutsumi et al. | ............... | 49/25 |
| 6,037,594 A | * | 3/2000 | Claytor et al. | .............. | 250/353 |
| 6,265,972 B1 | * | 7/2001 | Lee | ............................ | 340/541 |

FOREIGN PATENT DOCUMENTS

EP    935044    * 1/1999

OTHER PUBLICATIONS

B.E.A., Inc., "SuperScan Instruction Manual," Jun. 1996, B.E.A. Inc., 300 South Main Street, Pittsburgh, PA 15215, USA.

* cited by examiner

Primary Examiner—Jerry Redman
(74) Attorney, Agent, or Firm—Duane Morris LLP (57) ABSTRACT

An object sensor for use with an automatic swing door includes a light emitter, which is mounted on a door surface of the automatic swing door. The light emitter emits a light beam toward a floor. A distance detector is mounted on the door surface. The distance detector receives the light beam reflected from an object and develops an output signal having a value representing the distance of the object from the distance detector. A control unit makes a judgment based on the value of the output signal of the distance detector as to whether the object is approaching the door surface. The control unit stores the value of the distance detector output signal representing the distance between the distance detector and the floor, as a reference value. A dead zone is defined for the reference value to extend from the floor to a predetermined distance above the floor. When the value of the distance detector output signal is outside the dead zone, the control units judges the object to be approaching the door surface.

11 Claims, 9 Drawing Sheets

OBJECT SENSING SYSTEM FOR USE WITH AUTOMATIC SWING DOOR

This invention relates to an object sensing system for sensing an object approaching an automatic swing door and, more particularly, to such system employing sensors which measure the distance to an object by triangulation.

BACKGROUND OF THE INVENTION

An example of an object sensing system for an automatic swing door of the type described above is disclosed in WO97/42465 published on Nov. 13, 1997, "A METHOD FOR THE DETERMINATION OF THE DISTANCE AND THE ANGULAR POSITION OF AN OBJECT". The sensing system disclosed in this international application has a sensor disposed on a swing door at a location near a lower hinge. The sensor is driven to emit a plurality of light beams in the horizontal and diagonally upward directions at each of door positions to which the swing door rotates or swings from an open or closed position of the door. The door positions are spaced by a predetermined angle from adjacent door positions. The light beams are reflected from some object, and the distance of the object from the sensor is measured based on the reflected light beams. The measurement at each door position is compared with a reference value predetermined for each door position. If the measurement is equal to the reference value for a particular door position, it is judged that the reflected light is from a stationary object near the door from the beginning and that there is no object approaching the door. If the measurement is not equal to the reference value, the reflected light is judged to be from an object other than the stationary object, which may be an object approaching the door. In this manner, the sensor judges that there is an object approaching the door. The reference value for each door position is determined based on light beams reflected from a stationary object, for example, a guard rail and plant pots to which light beams are directed from the sensor at that door position.

Since the sensor emits light beams in the horizontal direction and in the diagonally upward direction, there may be no stationary object that reflects the light beams emitted for the determination of reference values at some door positions. Accordingly, it may happen that such reference values would not be prepared for all of the door positions and that an object approaching the door would not be detected at some door positions. It may sometimes happen that when the swing door is swung for preparing the reference values, there is an object moving at a location away from the door. Since the light beams are emitted in the horizontal and diagonally upward directions, there is a possibility that the emitted light beams may be reflected from such object. The reliability of reference values prepared based on the light beam reflected from such object is low. Since the reference values are formed from reflected light from stationary objects, they are affected by the state of the reflecting surfaces of the stationary objects and, therefore, may not be stable.

An object of the present invention is to provide an object sensing system for use with an automatic swing door with reference values having increased reliability so that the sensing system can detect an object with higher reliability.

Another object of the present invention is to provide an automatic swing door which can be installed properly with reduced possibility of error in installing the sensing system.

SUMMARY OF THE INVENTION

An object sensor for use with an automatic swing door according to the present invention includes a light emitter and a distance detector which are disposed on a door surface of a swing door. At each of plural angularly spaced door positions, the light emitter emits a light beam toward a floor where the swing door is installed. The distance detector receives the emitted light as reflected from a reflecting object and develops an output signal having a value representing the distance of the object from the distance detector. A control unit makes a judgment based on the value of the output signal of the distance detector as to whether or not the object is approaching the door surface. The control unit stores therein the value of the distance detector output signal representing the distance of the floor from the distance detector, as a reference value. With respect to the reference value, a dead zone covering a range of from the floor to a predetermined height is set. The control unit judges that the object is an object approaching the door surface when the value of the distance detector output signal is outside the dead zone.

The value of the distance detector output signal developed at the closed position of the swing door may be used as the reference value for each door position.

The value of the distance detector output signal developed at each door position may be used as the reference value for that door position.

The dead zone may be set with respect to each of the reference values for the respective door positions of the swing door.

The light emitter may emit a light beam a plural number of times at each door position to thereby cause the distance detector to develop the same number of output signals. In this case, the values of the output signals of the distance detector are averaged to provide the reference value for that door position.

The light emitter may emit a light beam a plural number of times at each door position in both opening and closing strokes or operations of the swing door, and the values of the output signals developed by the distance detector in each of the opening and closing strokes of the door are averaged. The average at a particular door position obtained during the opening stroke and the average at the same door portion obtained during the closing stroke are averaged to provide the reference value for that door position.

The sensor may be disposed on each of the "approach" and "swing" side surfaces of the swing door. The approach side of the door is the side that an object or a person can approach in order to pass through the door, and the swing side is the side of the door to which the door swings open. The sensors on the approach and swing side surfaces of the door are connected to communicate with each other. Each of the sensors has a switch. Each sensor is arranged such that when the switch of that sensor is operated, that sensor can automatically recognize itself to be an approach side sensor or a swing side sensor and develops a predetermined sensor type identification signal. The sensor type identification signal developed by one of the sensors is sent to the other sensor, and the other sensor automatically knows its sensor type. For example, if the sensor of which the switch is activated is the approach side sensor, the other sensor recognizes itself as the swing side sensor upon receipt of the sensor type identification signal supplied from the approach side sensor. Each sensor, after automatically recognizing its own sensor type, executes a program corresponding to the sensor type.

The program corresponding to the sensor type may be a program for preparing reference value data for use in determining the presence or absence of an object approaching the automatic swing door at each of the door positions.

The sensor whose switch is operated may be the approach side detector.

Each of the sensors may include an alarming unit which can operate for a predetermined time period following the activation of the switch to alarm a worker installing the sensors so that he or she can go out of the path the door swings to avoid collision with the door.

DESCRIPTION OF PREFERRED EMBODIMENT

Figure 1:
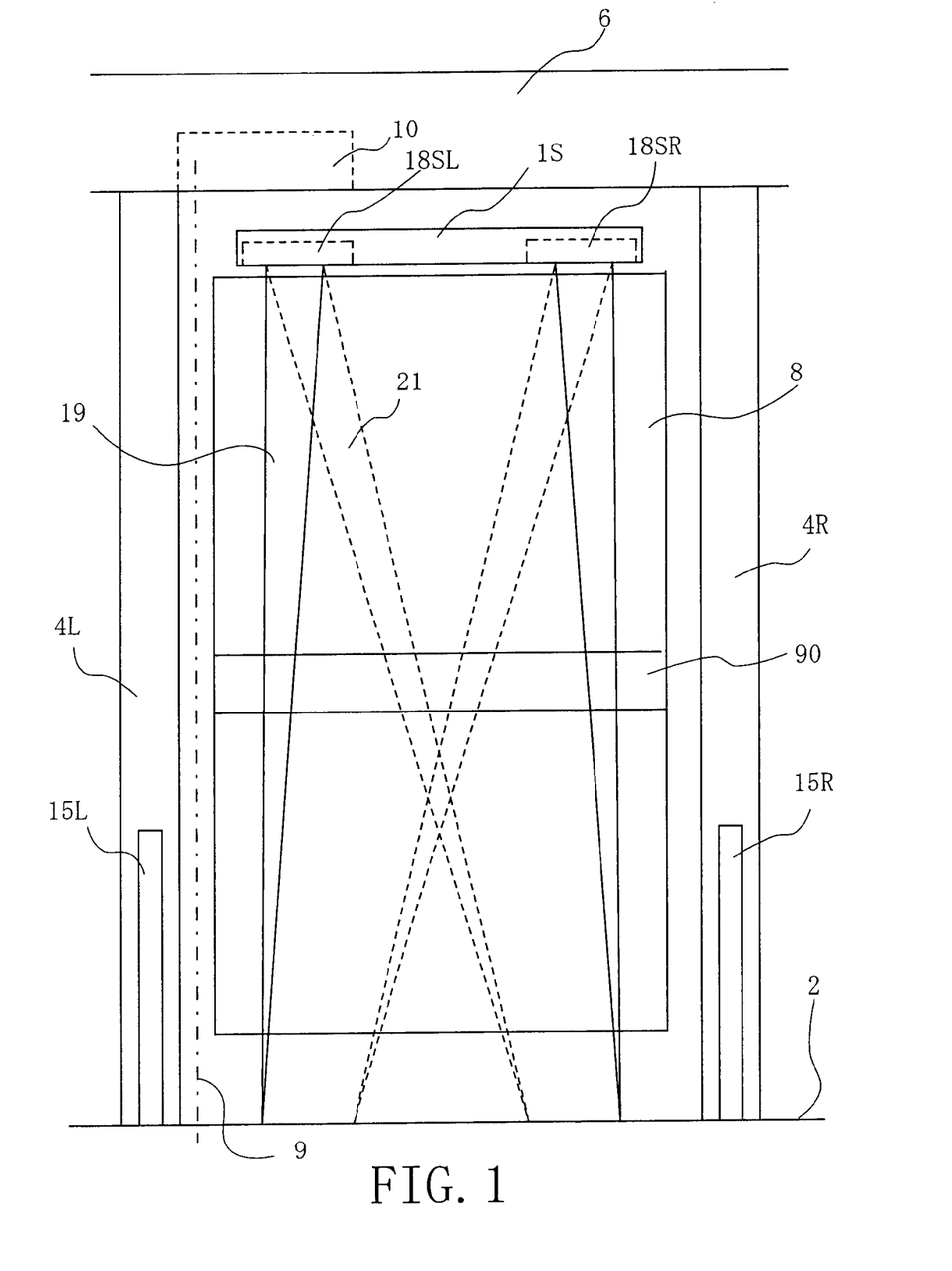
FIG. 1 is a front view of an automatic swing door with sensors according to a first embodiment of the invention.
Figure 2:
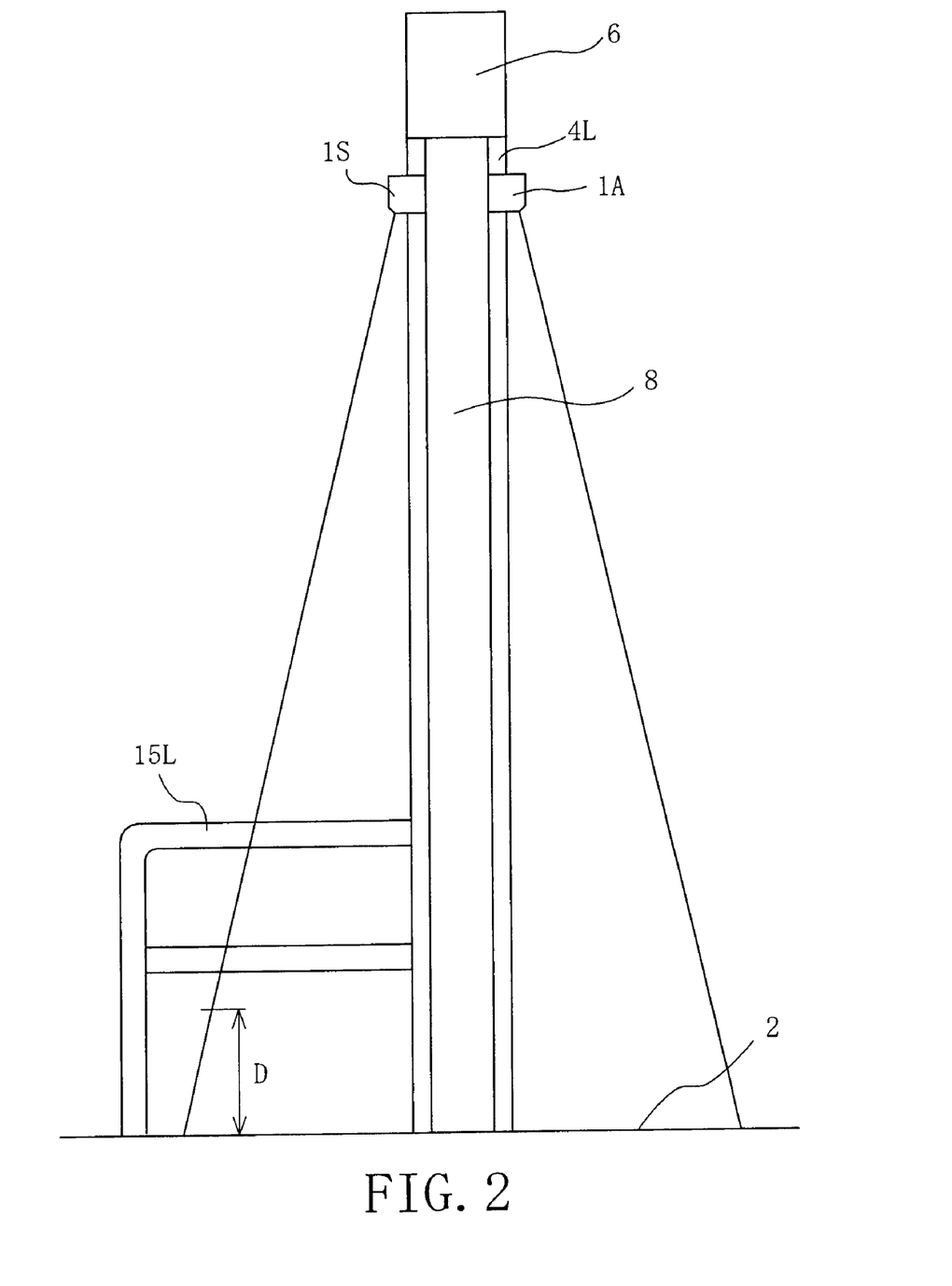
FIG. 2 is a side elevational view of the swing door of FIG. 1.
Figure 3:
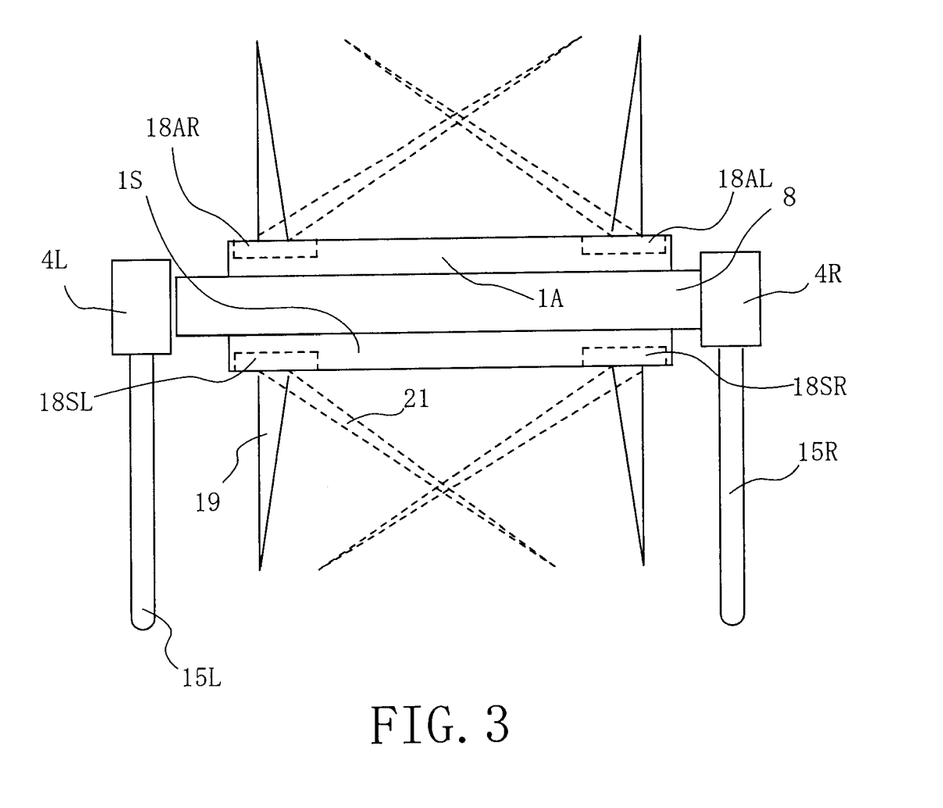
FIG. 3 is a plan view of the swing door of FIG. 1.

An object sensing system for use with an automatic swing door according to one embodiment of the present invention has object sensors 1S and 1A, and mounted on the automatic swing door in a manner as shown in FIGS. 1, 2 and 3. The automatic swing door includes a rectangular door 8 swingably mounted in a rectangular door opening in a wall.

The door opening is defined by a floor 2, two spaced-apart vertical jambs 4R and 4L perpendicular to the floor 2, and a transom 6 interconnecting the upper ends of the jambs 4R and 4L. The door 8 has a rotation axis 9 as indicated in phantom in FIG. 1 extending vertically near the jamb 4L. The door 8 rotates or swings about the rotation axis 9.

In the specification, the front side of the sheet of FIG. 1 (i.e. the left side of FIG. 2, and the lower side of FIG. 3) is referred to as "swing" side of the door 8, and the rear side of the sheet of FIG. 1 (i.e. the right side of FIG. 2 and the upper side of FIG. 3) is referred to as "approach" side. The door 8 swings forward from its closed position to the open position, with its swing side of the door 8 reaching first the open position side. The closed position is the position of the door 8 where the door 8 closes the door opening, and the open position is the position of the door 8 where the door 8 has swung open by a predetermined angle from the closed position. The door 8 swings to the open position, and, then, swings back from the open position to the closed position to close the door opening.

Figure 4:
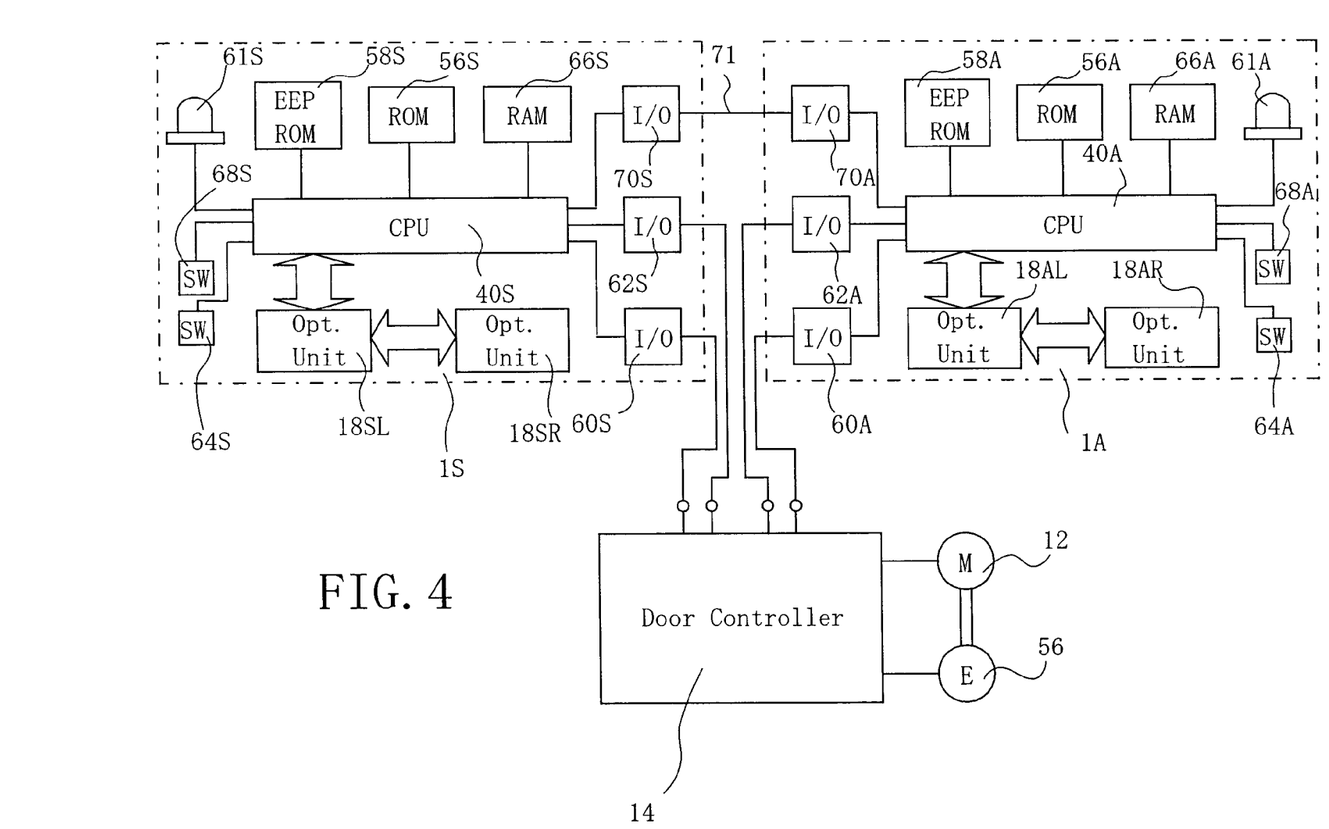
FIG. 4 is a block circuit diagram of sensors which may be used in the swing door of FIG. 1.

To drive the door 8 to swing, a driving unit 10 is disposed within the transom 6. The driving unit 10 includes, for example, a motor 12 and a door controller 14 for controlling the motor 12 as shown in FIG. 4.

Guard rails 15L and 15R are fixed to the swing side surfaces of the jambs 4L and 4R, respectively.

As shown in FIG. 1, an object sensor, e.g. an object sensor 1S, is mounted on the upper side of the swing side surface of the door 8. The sensor 1S includes optical units 18SL and 18SR disposed at locations offset toward the jambs 4L and 4R, respectively.

Figure 5:
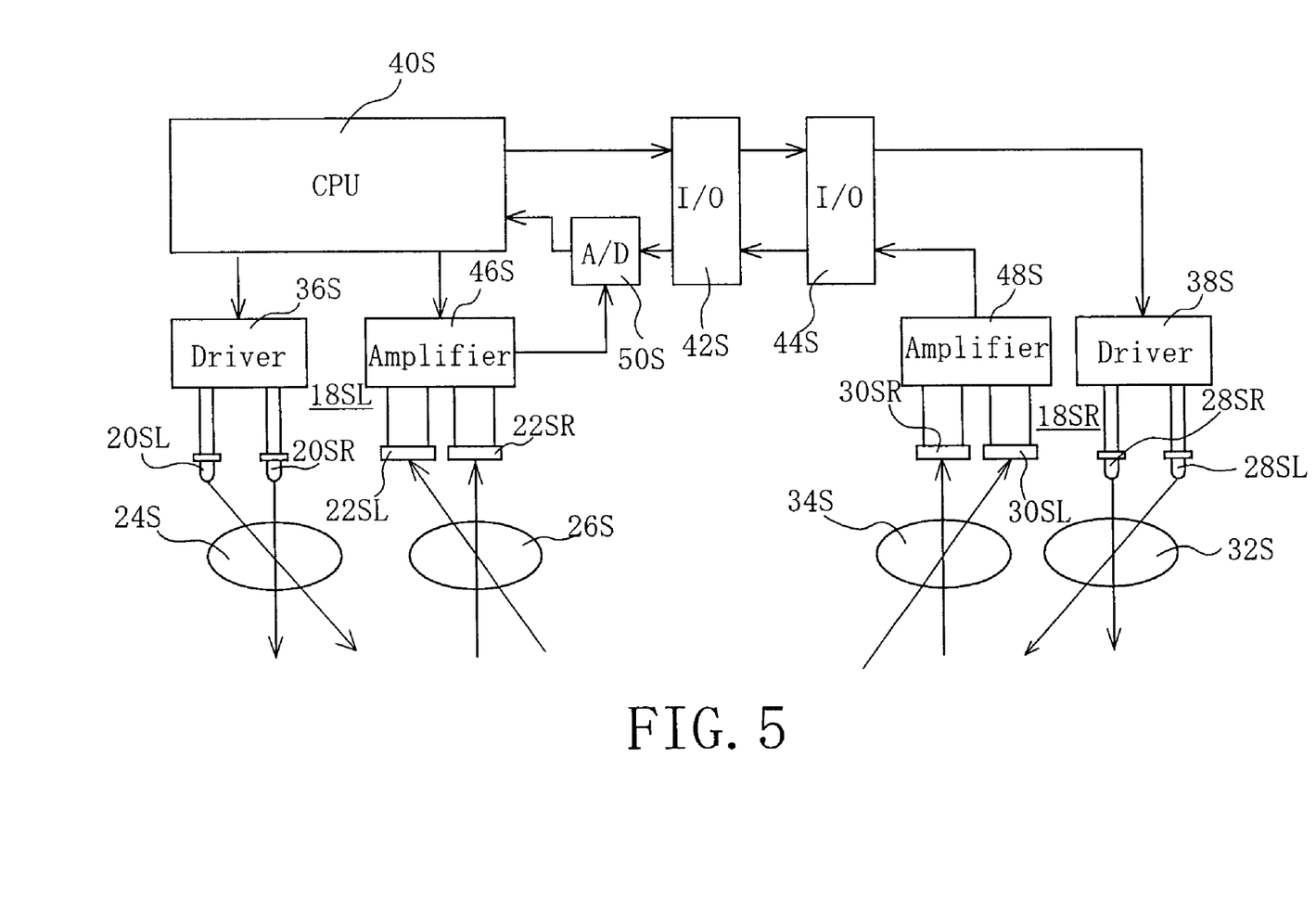
FIG. 5 is a detailed block circuit diagram of an optical unit shown in FIG. 4.

As shown in detail in FIG. 5, the optical unit 18SL includes two light emitters 20SL and 20SR which may be, for example, infrared (IR) light emitting diodes. The light emitters 20SL and 20SR emit and project light beams to the floor 2 which defines the lowest end of a sensing region of the sensor. It should be noted, however, that the light emitter 20SR emits a light beam 19 shown in FIGS. 1 and 3 diagonally forward and downward, while the light emitter 20SL emits a light beam 21 diagonally forward and downward, but toward a position shifted toward the jamb 4R. The optical unit 18SL includes condensing means, e.g. a light emitter lens 24S and a light receiver lens 26S. The lenses 24S and 26S are arranged in such a way that the light beam emitted by the light emitter 20SR is reflected toward and impinges on a distance detector 22SR, and the light beam from the light emitter 20SL impinges on a distance detector 22SL of the optical unit 18SL. The distance detectors may be position sensitive devices like the one shown in the previously cited WO/97/42465.

The locations on each of the distance detectors 22SL and 22SR onto which light reflected from the floor 2 and light reflected from an object on the floor 2 are different. Based on this fact, the distance detectors 22SL and 22SR measure the distances from the respective distance detectors of the object reflecting the light toward the detectors by triangulation, and develop output signals having values representative of the measured distances. The configuration and operating principle of such distance detectors are known, and, therefore, no more detailed description is given here.

Similarly, the optical unit 18SR includes light emitters 28SL and 28SR, distance detectors 30SL and 30SR, a light emitter lens 32S and a light receiver lens 34S. The light emitters 28SL and 28SR project light beams toward the floor 2. It should be noted, however, that the light emitter 28SR projects a light beam substantially right ahead and diagonally downward, while the light emitter 28SL emits a light beam diagonally forward and downward, but toward a position on the floor 2 shifted toward the jamb 4L.

The light emitters 20SR and 20SL emit light when a driving signal is applied to them from a driver circuit 36S, and the light emitters 28SR and 28SL emit light when a driving signal is applied to them from a driver circuit 38S. The light emitters 20SR, 20SL, 28SR and 28SL emit light at different times. For example, they may emit light sequentially, beginning with the light emitter 20SR, then 20SL and 28SR and ending with 28SL, for a predetermined time period. Such control is performed by the driver circuits 36S and 38S in response to control signals from a control unit, e.g. a CPU 40S, for the optical units 18SL and 18SR.

Light beams sequentially emitted by the light emitters 20SR, 20SL, 28SR and 28SL are reflected from some object, and such reflected light beams impinge onto the distance detectors 22SR, 22SL, 30SR and 30SL in sequence. Then, the distance detectors 22SR, 22SL, 30SR and 30SL sequentially develop output signals representing the distances of the object from the respective distance detectors. The output signals of the distance detectors 22SL and 22SR are amplified in an amplifier circuit 46S, and the output signals of the distance detectors 30SL and 30SR are amplified in an amplifier circuit 48S. The output signals of the distance detectors 22SL and 22SR amplified in the amplifier circuit 46S are converted into a digital distance representative signal in an analog-to-digital (A/D) converter 50S and is applied to the CPU 40S.

The output signals from the distance detectors 30SR and 30SL as amplified in the amplifier circuit 48S are applied through interface (I/O) circuits 44S and 42S to the A/D converter 50S, where they are converted into digital distance representative signals and applied to the CPU 40S.

The CPU 40S forms a unit together with the light emitters 20SL and 20SR, the distance detectors 22SR and 22SL, the driver circuit 36S, the amplifier circuit 46S and the A/D converter 50S. The light emitters 28SL and 28SR, the distance detectors 30SR and 30SL, the driver circuit 38S, and the amplifier circuit 48S form another unit. The two units are mounted at locations spaced from each other. The interface circuits 44S and 42S are used to make it possible to control the driver circuit 38S as well as the driver circuit 36S by the CPU 40S and also to use the A/D converter 50S for analog-to-digital conversion of the output signal of the amplifier circuit 48S as well as the output signal of the amplifier circuit 46S.

Referring to FIG. 4, the CPU 40S operates in accordance with a program stored in a ROM 56S. In addition to controlling the driver circuits 36S and 38S, the CPU 40S makes a judgment as to whether or not the distance representative digital signals are within dead zones determined in accordance with respective reference values and dead zone width values which are stored in storage means, e.g. an EEPROM 58S. When the digital distance representative signals are outside the dead zones, the CPU 40S sends an object-detection indicating signal to the door controller 14 through an interface (I/O) circuit 60S, and, at the same time, turns on a pilot lamp 61S to advise a worker installing the sensors to get out of the path along which the door swings.

The door controller 14 is provided with an encoder 56 which detects the rotation of the motor 12. From a signal from the encoder 56, the controller 14 prepares a door position representative signal showing the position, for example, angle of the door 8 relative to, for example, the closed position. The door position representative signal is applied through an interface (I/O) circuit 62S to the CPU 40S. For the respective door positions as represented by the respective door position representative signals, the reference values are set for the respective ones of the distance detectors 22SR, 22SL, 30SR and 30SL.

The reference values at each door position correspond to the distances between the respective ones of the distance detectors 22SR, 22SL, 30SR and 30SL and the floor 2 at that door position. The reference values are determined from digital distance representative signals supplied from the respective distance detectors 22SR, 22SL, 30SR and 30SL through the A/D converter 50S when a learning switch 64S provided in association with the CPU 40S is turned on to thereby cause the door 8 to swing from the closed position to the open position and then from the open position back to the closed position. As shown in FIG. 2, a dead zone D is a zone between each reference value and a dead zone boundary value. The dead zone boundary value is equal to the reference value minus a dead zone width D (which is equal to a predetermined distance from, for example, the floor 2).

A RAM 66S is connected to the CPU 40S and is used as a working area in, for example, preparing the reference values. The CPU 40S is also provided with a setting switch 68S, which may be formed of, for example, a dip switch. Through the setting switch 68S, various modes of operation of the sensing system can be selected. Such various modes of operation do not directly relate to the present invention and, therefore, their detailed description is not given.

A sensor 1A similar to the sensor 1S is mounted in the approach side of the door 8. The approach side sensor 1A has the same structure as the swing side sensor 1S, and, therefore, its components are provided with the same reference numerals as used for the corresponding components of the sensor 1S, with the suffix S changed to A. Therefore no detailed description is given with respect to the approach side sensor 1A.

The sensors 1S and 1A respectively include communication means, e.g. interface circuits 70S and 70A according to, for example, RS232C, which are connected to each other with a cable 71.

The learning switches 64S and 64A are used to make the sensors 1S and 1A know on which side of the door 8 the sensors 1S and 1A are mounted.

Usually, the sensor of which the learning switch is manually operated by a worker installing the sensors is predetermined to be the approach side sensor so as to prevent the door 8 from colliding against the worker. The same programs are stored in the ROMs 56S and 56A of the sensors 1S and 1A.

Figure 6A:
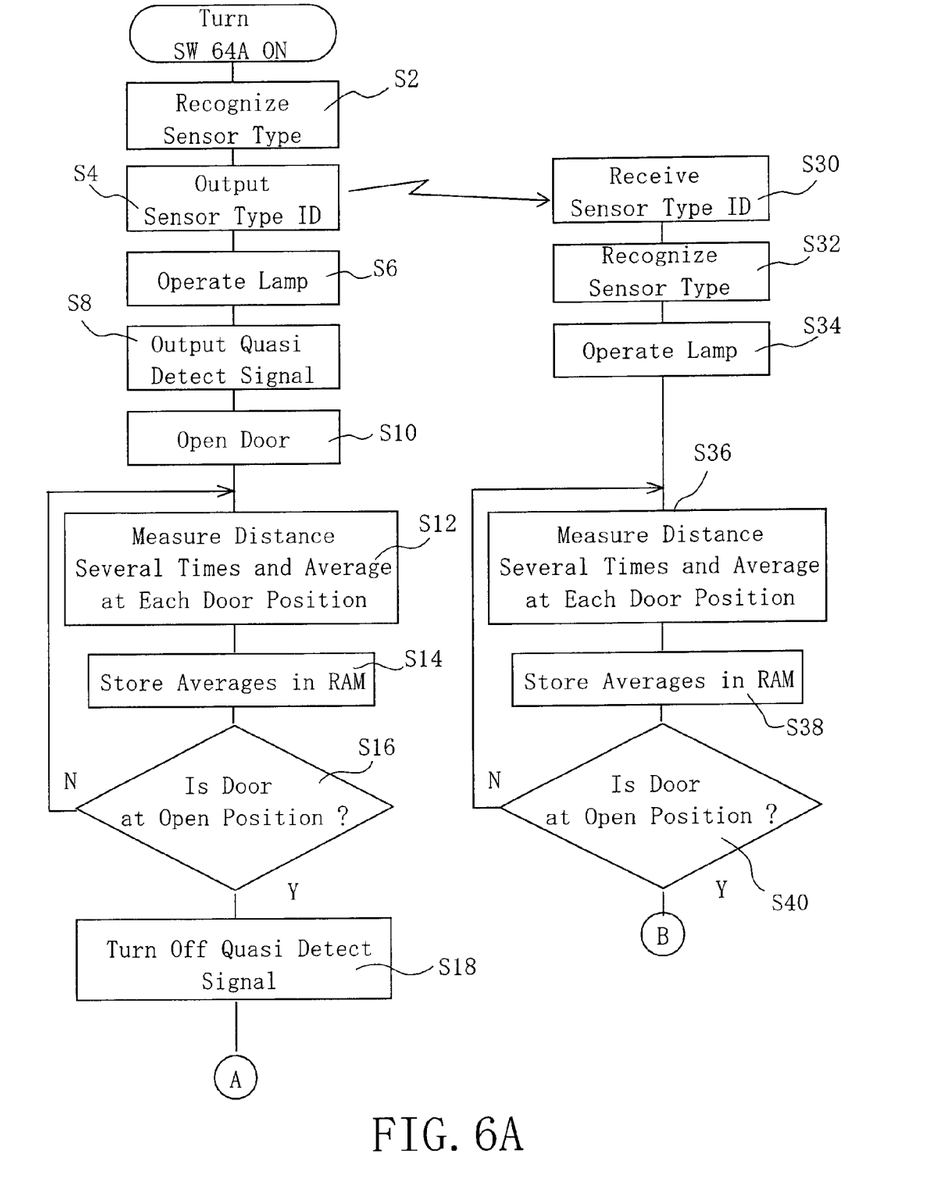
FIGS. 6A and 6B show a flow chart of reference value preparation processing in the sensors of FIG. 4.
Figure 6B:
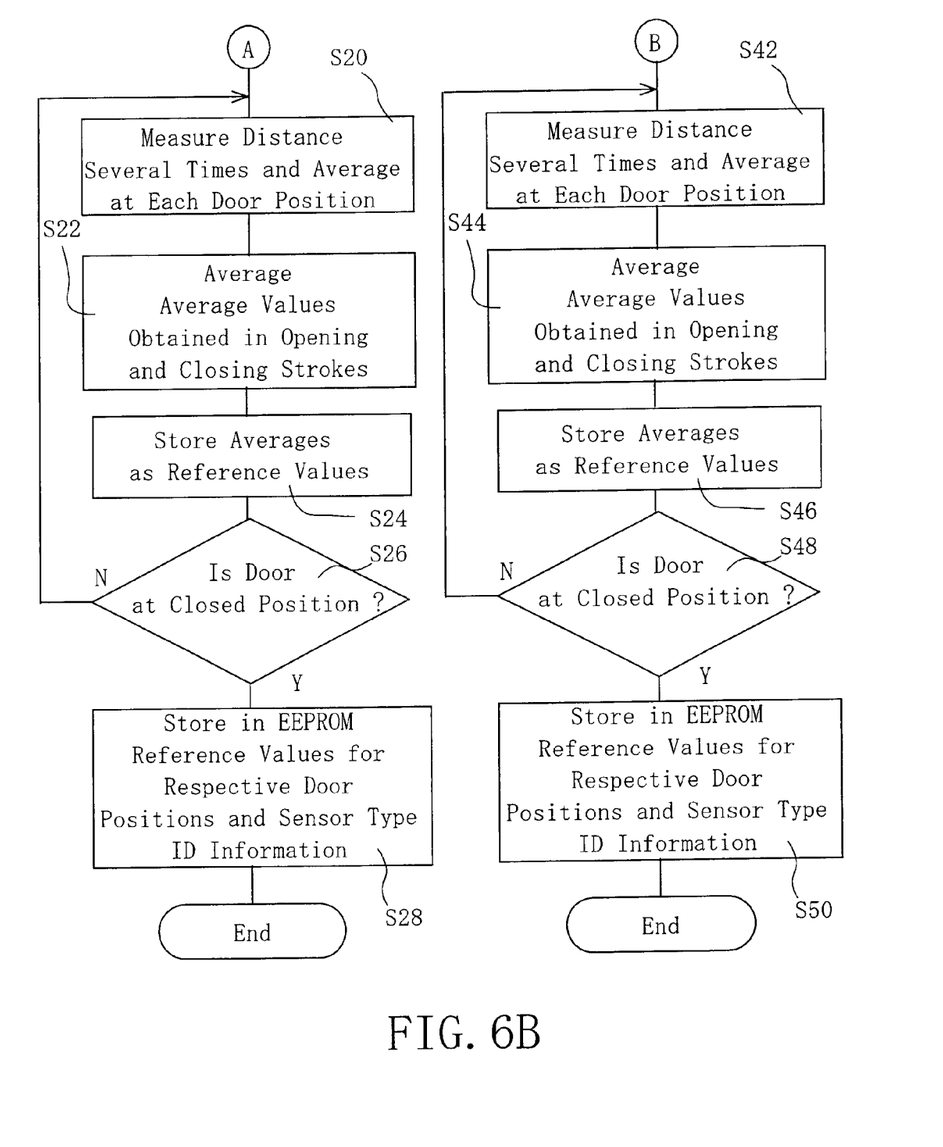

FIGS. 6A and 6B together show a flow chart of initial learning processing the swing side and approach side sensors 1S and 1A execute for preparing the reference values. The initial learning is started by a worker who turns on the learning switch 64A of the approach side sensor 1A when the sensors 1S and 1A are mounted on the door 8.

Then, the CPU 40A of the approach side sensor 1A executes the following processing. First, in response to the operation of the initial learning switch 64A, the CPU 40A recognizes itself as the CPU of the sensor 1A on the approach side (Step S2). Then, the CPU 40A sends a sensor type identification signal to the swing side sensor 1S through the interface circuits 70S and 70A. (Step S4).

After that, the pilot lamp 61A is turned on and off for a predetermined time period (Step S6). The worker walks off the door 8 within the predetermined period during which the pilot lamp 61A is turned on and off so that he or she cannot be detected by the sensor 1A when the door 8 swings.

When the predetermined time period lapses, the CPU 40A sends a quasi object-detection indicating signal to the door controller 14 through the interface circuit 62A (Step S8), whereby the door controller 14 causes the door 8 to be opened (Step S10). Then, the door 8 starts swinging from the closed position toward the swing side. That is, the opening stroke is executed. As the door 8 swings, the output signal from the encoder 56 changes. The output signal of the encoder 56 is applied from the controller 14 through the interface circuits 62A and 62S to the CPUs 40A and 40B, respectively. The CPU 40A computes the current door position of the door 8 based on the output signal of the encoder 56 and develops a door position representative signal.

At each door position, the CPU 40A causes the light emitters 20AL, 20AR, 28AL and 28AR to be sequentially driven to emit light. The sequential driving of the light emitters is repeated several times. Then, each of the distance detectors 22AL, 22AR, 30AL and 30AR develops the corresponding number of output signals. The output signals are converted in the A/D converter 50A into respective digital distance representative signals. The resulting digital distance representative signals developed from each of the distance detectors 22AL, 22AR, 30AL and 30AR are averaged for each of the distance detectors 22AL, 22AR, 30AL and 30AR (Step S12). The CPU 40A, then, stores the respective average values in the RAM 66A (Step S14).

The CPU 40A makes a judgment based on the door position representative signal as to whether the door 8 has reached the open position (Step S16). When it is judged that the door 8 has not reached the open position, Steps S12 through S16 are repeated until the open position has been reached.

When the CPU 40A judges that the door 8 has reached the open position, the CPU 40A ceases to send the quasi object-detection indicating signal to the door controller 14 (Step S18). This causes the door 8 to swing from the open position back to the closed position. That is, the closing stroke starts.

As shown in FIG. 6B, during the closing stroke, too, the CPU 40A, as in Step S12, causes the light emitters 20AL, 20AR, 28AL and 28AR to be sequentially driven to emit light at each door position. The sequential driving of the light emitters is repeated several times. The corresponding number of output signals developed by the distance detectors 22AL, 22AR, 30AL and 30AR are converted into digital distance representative signals in the A/D converter 50A. The resulting digital distance representative signals for each distance detector are averaged (Step S20). The CPU 40A adds the resulting average values at each door position for the respective distance detectors 22AL, 22AR, 30AL and 30AR to the average values computed during the opening stroke at that door position for obtaining average values (Step S22). The CPU 40A stores these average values in the RAM 66A as the reference values for the respective distance detectors 22AL, 22AR, 30AL and 30AR at that door position (Step S24).

Then, the CPU 40A makes a judgment based on the door position representative signal as to whether the door 8 has reached the closed position (Step S26). If it is judged that the closed position has not yet been reached, the sequential execution of Steps S20, S22, S24 and S26 is repeated until it is judged that the door 8 has reached the closed position. When the CPU 40A judges that the door 8 has reached the closed position, the respective reference values are stored in the EEPROM 58A, being correlated with the respective door positions. The sensor type identifying information to indicate that the stored reference values are for the approach side is also stored (Step S28). This completes the reference value preparation in the approach side sensor 1A.

In the swing side sensor 1S, the sensor type identification signal from the approach side sensor 1A is received through the interface circuits 70A and 70S (Step S30), as shown in FIG. 6A. In response to the reception of the sensor type identification signal, the following processing is executed. Although the swing side sensor 1S, too, has stored in the ROM 56S a program for executing steps same as S2, S4, S6, S8, S10, S12, S14, S16, S18, S20, S22, S24, S26 and S28, it does not execute the program. Instead, due to the sensor type identification signal received from the approach side sensor 1A, it executes a program for the following processing.

The CPU 40S, upon receipt of the sensor type identification signal from the sensor 1A, knows that it is the CPU of the swing side sensor 1S (Step S32), and causes the pilot lamp 61S to emit light intermittently (Step S34). While the lamp 61S is emitting light intermittently, a worker installing the sensors on the swing side walks off the door 8 so that he or she may not be detected by the sensor 1S. The time period during which the lamp 61S is repeatedly turned on and off is equal to or shorter than the time period set for the lamp 61A.

After the intermittent emission of light by the lamp 61S finishes, the quasi object-detection indicating signal is sent to the door controller 14 from the approach side sensor 1A, which causes the door 8 to start swinging. Then, as in Step S12, the light emitters, 20SL, 20SR, 28SL and 28SR are sequentially driven to emit light, and the sequential driving of the light emitters is repeated several times at each door position. The corresponding number of output signals developed by each of the distance detectors 22SL, 22SR, 30SL and 30SR are converted into digital distance representative signals in the A/D converter 50S, and the digital distance representative signals are averaged (Step S36). Then, the CPU 40S causes the respective average values for the distance detectors 22SL, 22SR, 30SL and 30SR to be stored in the RAM 66S (Step S38).

The CPU 40S makes a judgment based on the door position representative signal from the controller 14 as to whether or not the door 8 has reached the open position (Step S40). If it is judged that the door 8 has not reached the open position, the CPU 40S repeats Steps S36–S40 until the door 8 is judged to have reached the open position.

Since the door position representative signal applied to the CPU 40S is prepared from the encoder output of the encoder 56 from which the door position representative signal applied to the approach side CPU 40A is prepared, the CPU 40A judges that the door 8 has reached the open position when the CPU 40S does. Then, the CPU 40A stop sending the quasi object-detection indicating signal to the door controller 14, and the door 8 starts to swing from the open position toward the closed position.

Then, as shown in FIG. 6B, at each door position, the CPU 40S causes the light emitters 20SL, 20SR, 28SL and 28SR to be sequentially driven, as in Step S20, and the sequential driving is repeated several times, which results in generation of the corresponding number of output signals from each of the distance detectors 22SL, 22SR, 30Sl and 30SR. The output signals from each of the distance detectors 22SL, 22SR, 30Sl and 30SR are converted into digital distance representative signals in the A/D converter 50S, and the resulting digital distance representative signals for each distance detector are averaged (Step S42). The average value for each distance detector is added to the corresponding average value at each door position determined during the opening stroke, and a new average value is computed (Step S44) as in Step S22. The new average values for the respective distance detectors at each door position are stored as reference values for that door position in the RAM 66S (Step S46).

As done in Step S26 by the CPU 40A, the CPU 40S makes a judgment based on the door position representative signal as to whether or not the door 8 has reached the closed position (Step S48). If the door 8 is judged not to have reached the closed position yet, sequential execution of Steps S42, S44, S46 and S48 is repeated until it is judged that the door 8 has reached the closed position. When the CPU 40S judges that the door 8 has arrived at the closed position, the CPU 40S causes the EEPROM 58S to store therein the respective reference values correlated with the respective door positions together with sensor type identifying information which shows that the sensor is the swing side sensor 1S (Step S50). This completes the reference value preparation to be done in the swing side sensor 1S.

The above-described reference value preparation for each of the swing side and approach side may be done only once when the automatic swing door is installed, or it may be done each time maintenance service of the swing door is done. Alternatively, it may be done each time power is supplied to the door.

The approach side sensor 1A is also provided with a program for executing steps similar to Steps S30, S32, S34, S36, S38, S40, S42, S44, S46, S48 and S50 of the swing side sensor 1S, which is stored in ROM 56A. However, the turning on of the initial learning switch 64A of the sensor 1A causes such steps not to be executed, but, instead, Steps S2, S4, S6, S8, S10, S12, S14, S16, S18, S20, S22, S24, S26 and S28 are executed.

As described above, the sensors 1A and 1S have completely the same arrangement, and the programs stored in the ROM 56A are same as the ones stored in the ROM 56S. Then, one of the sensors of which the initial learning switch is operated functions as the approach side sensor, and the other functions as the swing side sensor. It is the quasi object-detection indicating signal from the approach side sensor that causes the controller 14 to operate to open the door 8. Accordingly, unless the initial learning switch on the sensor mounted on the approach side of the door 8 is mistakenly operated, the initial learning can be achieved without fail.

Figure 7:
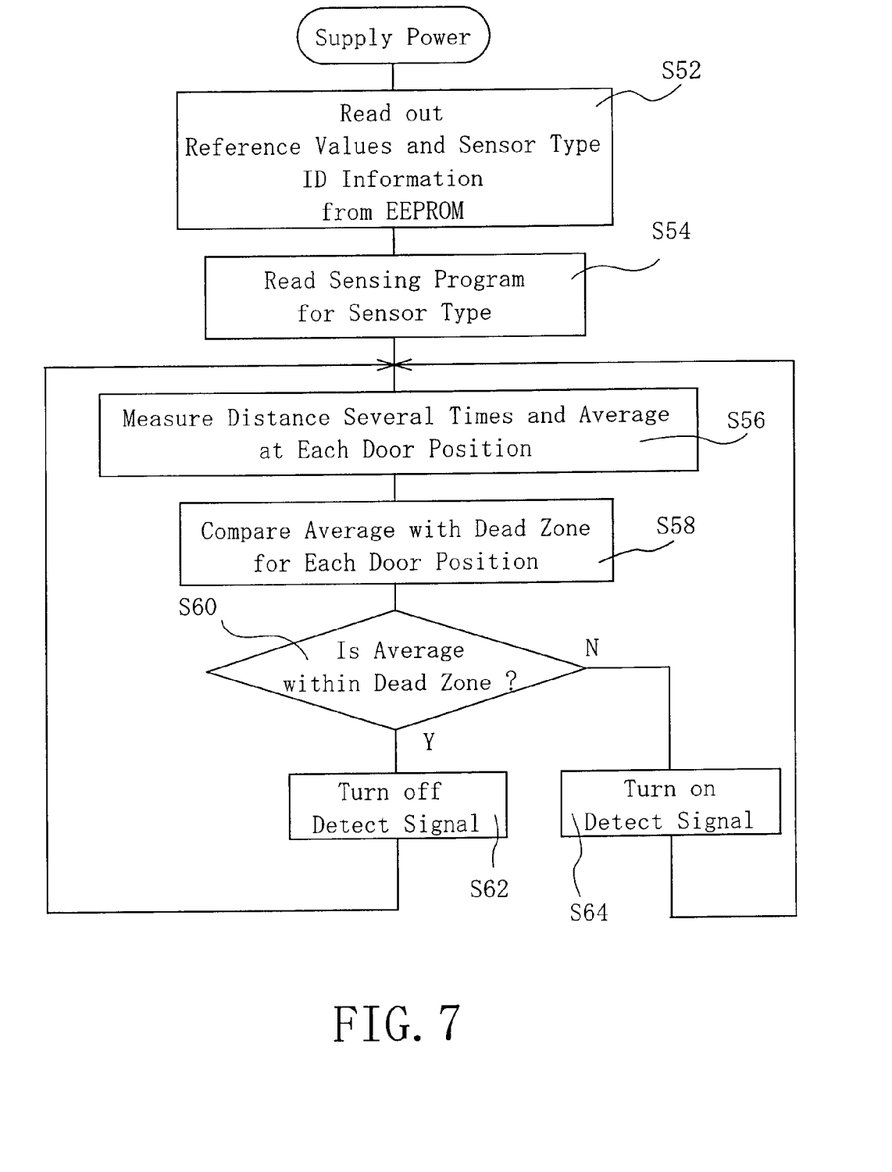
FIG. 7 is a flow chart of object sensing processing done in the sensors of FIG. 4.

FIG. 7 is a flow chart of the processing to judge whether or not the sensors 1A and 1S with the prepared reference values have sensed an object. First, the CPUs 40A and 40S in the sensors 1A and 1S read out the respective reference values and the respective sensor type identifying information from the EEPROMs 58A and 58S (Step S52), and, then, read out and execute the object sensing programs corresponding to the read-out sensor type identifying information from the ROMs 56A and 56S (Step S54).

The approach side sensor 1A, for example, is provided with the optical units 18AL and 18AR. At the closed and open positions, all of the light emitters 20AR, 20AL, 28AR and 28AL of the optical units 18AL and 18AR are driven to emit light to thereby form a nearby sensing area closer to the door 8 and a remote sensing area off the door 8 to thereby provide a large sensing zone for sensing a human therein, if present. At door positions other than the closed and open positions, if the large sensing zone were employed, a human who does not intend to pass through the door would be sensed even when he or she is in the remote sensing area. To avoid it, when the door 8 is at door positions other than the open and closed positions, some of the light emitters of the approach side sensor 1A are deenergized so as to form only the nearby sensing area to provide a smaller sensing zone.

On the other hand, the swing side sensor 1S is arranged as follows. When the door 8 is in the closed position, a nearby sensing area close to the door 8 and a remote sensing area remote from the door 8 are formed to thereby provide a larger sensing zone. When the door 8 starts to swing to open, only the nearby sensing area is made active, and as the door 8 swings wider, sub-areas of the nearby sensing area nearer to the rotation axis of the door 8 are successively inactivated. Both of the ROMs 56A and 56S have stored therein both approach side and swing side sensing programs which are different from each other. The CPU 40S, which has recognized itself as the CPU for the swing side sensor based on the sensor type identifying information stored in the EEPROM of that sensor, executes the swing side sensing program, while the CPU 40A, which has recognized itself as the CPU for the approach side sensor, executes the approach side one of the two sensing programs. Conversely, if the CPU 40S, which has been described as the CPU for the swing side sensor, recognizes itself as the CPU for the approach side sensor, it executes the approach side sensing program, and the CPU 40A, which has been described as the CPU for the approach side sensor, it executes the swing side sensing program.

While the door 8 is swinging in accordance with the command supplied from the door controller 14, the door controller 14 provides the door position representative signal representing the position of the door 8. Each time the door controller 14 provides the CPUs 40A and 40S with the door position representative signal, they cause their respective light emitters to be sequentially driven to emit light, repeating the sequential driving of the light emitters several times. The distance detectors, receiving reflected light, develops output signals, which are converted into digital distance representative signals in the A/D converters 50A and 50S. The resulting digital distance representative signals resulting from the distance representative signals from each distance detector at each door position are averaged (Step S56). The CPU 40A and 40S compare the respective averaged values obtained in Step S56 with the respective dead zones determined based on the respective reference values for the respective door positions (Step S58). In other words, each of the CPUs 40A and 40S makes a judgment as to whether or not each average value is larger than the dead zone boundary value which is equal to the reference value minus the dead zone width D shown in FIG. 2 for each door position (Step S60).

If the average value is within the dead zone, i.e. larger than the dead zone boundary value, in other words, if the answer to the query in Step S60 is YES, it is judged that there is no object sensed at that door position, and the CPUs 40A and/or 40S turns off the object-detection indicating signal, i.e. sends no object-detection indicating signal to the door controller 14. Therefore, the door 8 continues to swing, and the procedure returns to Step S56. The execution of Steps S56, S58, S60 and S62 is repeated unless the average value is judged to be outside the dead zone.

If one or more of the average values for the respective distance detectors at each door position are judged to be a value outside the relevant dead zone or, in other words, a value smaller than the dead zone boundary values for such distance detectors at that door position, it is judged that the presence of an object is sensed at that door position, and, therefore, the object-detection indicating signal is sent to the door controller 14 (Step S64). If the CPU sending the object-detection indicating signal is the CPU of the swing side sensor 1S, the door controller 14 stops or decelerates the door 8. On the other hand; if the CPU sending the object-detection indicating signal is the CPU of the approach side sensor 1A, the door controller 14 moves the door 8 toward the open position, and, at the same time, the pilot lamp is operated. Following Step S64, Step S56 is executed again.

As described above, the sensors 1S and 1A use, as the reference values at each door position, the distances between the respective distance detectors and the floor 2, which distances are determined based on light beams emitted from the corresponding light emitters and reflected from the door 2 to impinge on the distance detectors. Accordingly, whichever door position the door 8 is, the distance detectors can receive reflected light from the floor 2, and, therefore, reference values can be set for any door positions. In addition, since whether or not an object is present is determined based on whether the distance of an object from each distance detector is outside or within the dead zone set in proximity to the floor 2, even if a particular reference value include an error caused, for example, by stains on the floor 2, influence of the error can be reduced.

Furthermore, since the reference value can be set for each door position, it can be set with a stationary object, e.g. a flower pot set on the floor 2, taken into account, to avoid erroneous object detection.

Also, since both when the reference values are determined and when a judgment of the presence of an object is made, measurements at each door position are averaged, influences of disturbance noise in the reflected light beam, and variations among circuits, such as the light emitters, the distance detectors, and the amplifier circuits, can be removed.

The reference value at each door position is prepared by measuring the distance to the floor 2 plural times and averaging the measurements in the door opening stroke, also measuring plural times and averaging the measurements in the door closing stroke, and then averaging the two average distances obtained in the opening and closing strokes for use as the reference value at that door position. Accordingly, even when less than a predetermined number of measurements can be done at a particular door position during, for example, the opening stroke, a plurality of measurements can be done at that particular door position in the closing stroke, precise reference values can be obtained.

Once the learning switch on the sensor mounted on the approach side is operated in the initial learning operation, the one of the two sensors having the same structure and arrangement which is mounted on the approach side of the door can automatically operate as the approach side sensor, whereas the sensor on the swing side of the door automatically operate as the swing side sensor.

Figure 8:
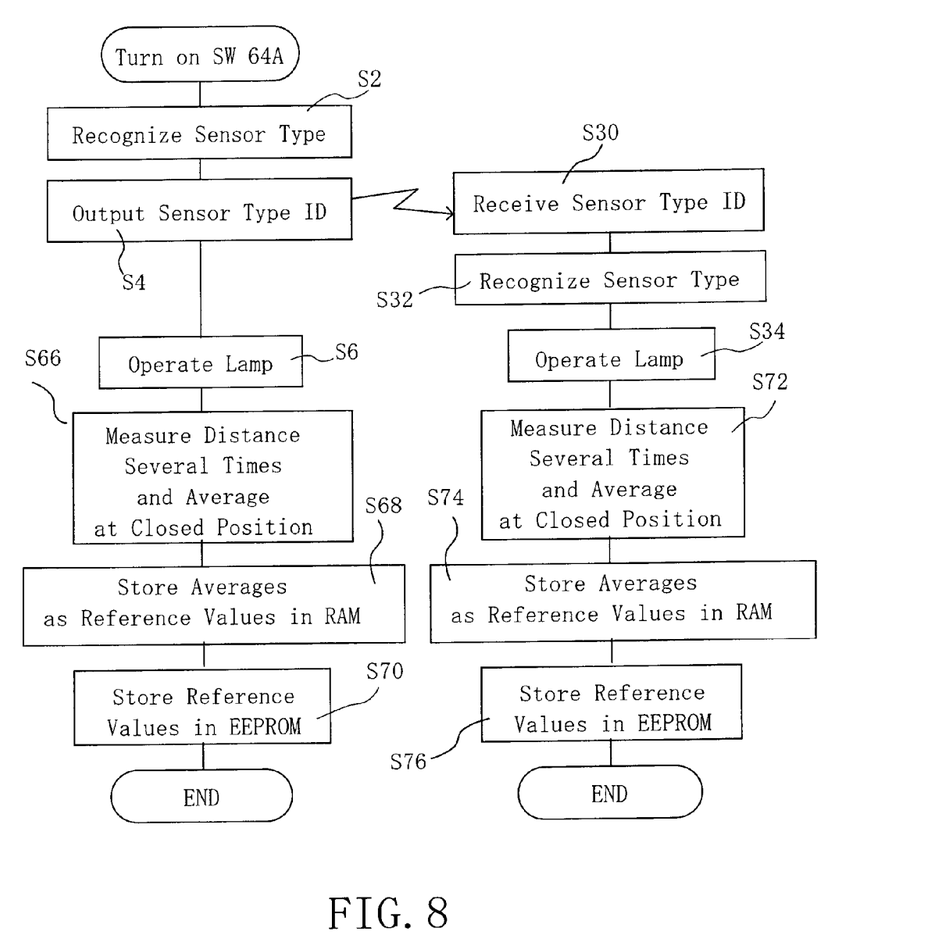
FIG. 8 is a flow chart of reference value preparation processing done in the sensors of FIG. 4, which is different from the processing shown in FIGS. 6A and 6B.

In the above description, the reference value has been described to be prepared for each door position, but the reference value at, for example, the closed position may be used as the reference value for all of the door positions. The process for preparing such reference value is shown in FIG. 8.

In the approach side sensor 1A, immediately after Step S6, the light emitters 20AL, 20AR, 28AL and 28AR are sequentially driven to emit light at the closed position and this sequential light emission is repeated several times. The distance detectors 22AL, 22AR, 30AL and 30AR receive the light emitted from the corresponding light emitters and reflected to them, and each develops several output signals. These output signals are converted to digital distance representative signals in the A/D converter 50A, and the digital distance representative signals for each of the distance detectors 22AL, 22AR, 30AL and 30AR are averaged (Step S66). The resultant average values are stored in the RAM 66A (Step S68), and, finally, these average values are stored as the reference values in the EEPROM 58A (Step S70).

Similarly, in the swing side sensor 1S, following Step S34, the light emitters 20SL, 20SR, 28SL and 28SR are sequentially driven to emit light, and the sequential driving of the light emitters 20SL, 20SR, 28SL and 28SR is repeated several times. The emitted light is reflected from the floor 2 and received by the respective distance detectors corresponding to the light emitters, and output signals of the distance detectors are converted into digital distance representative signals in the A/D converter 50S. The resultant digital distance representative signals for each of the distance detectors 22SL, 22SR, 30SL and 30SR are averaged (Step S72). The resultant average values are stored in the RAM 66S, and, finally, these values are stored as the reference values in the EEPROM 58S (Step S76).

In this case, the processing done in Step S58 shown in FIG. 7 is changed to a processing of comparing the average values at the respective door positions with the dead zones determined by the average values at the closed position and the dead zone width.

With this arrangement, the sensing system can be used with a door with no encoder 60 and, therefore, with no door position representative signal available from the door controller. Normally, the door 8 is in the closed position, and, therefore, the reference values can be prepared readily.

What is claimed is:

1. An object sensor for use with an automatic swing door, comprising:

a light emitter mounted on a door surface of said automatic swing door for emitting and projecting a light beam toward a floor surface where said swing door is installed;

a position sensitive device mounted on said door surface for receiving said light beam as reflected from an object, a position on said light sensitive device at which said light beam reflected from said object is incident changing as a distance of said object from said position sensititve device changes, said position sensitive device outputting a digital distance-representative signal having a value representative of the distance of said object from said position sensitive device, said value of said digital distance-representative signal varying in accordance with said incident position on said position sensitive device of said reflected light beam; and a control unit making a judgment as to whether or not said object is approaching said door surface based on the value of said digital distance-representative signal of said position sensitive device;

wherein:

said control unit causes memory means to store therein, as a reference value, the value of said digital distance-representative signal which said position sensitive device outputs when said light beam is projected toward said floor surface in the absence of any object in the vicinity of said door, said memory means having stored therein a value representative of a predetermined height from a structure including said floor surface; and said control means, in an object detecting mode of operation, computes from said reference value and said predetermined height representative value, a value representing a distance from said position sensitive device to a boundary of a dead zone at said predetermined height from said structure including said floor surface, and judges that an object is approaching said door when the value of said digital distance-representative signal developed by said position sensitive device is smaller than said value representing the distance from said position sensitive device to said boundary of said dead zone.

2. The object sensor according to claim 1 wherein said control unit sets as the reference value for each of a plurality of door positions said swing door assumes during operation thereof, the value of said digital distance signal of said position sensitive device developed when said swing door is at a closed position thereof.

3. The object sensor according to claim 2 wherein said light emitter emits a light beam a plural number of times at each door position, and said control unit averages the values of a corresponding number of digital distance signals from said position sensitive device and sets the average value as said reference value for each of said door positions.

4. The object sensor according to claim 1 wherein said control unit sets as the reference value for each of a plurality of door positions said swing door assumes during operation thereof, the value of said digital distance signal of said position sensitive device developed when said swing door is at that door position.

5. The object sensor according to claim 4 wherein said control unit sets the dead zone for each door position of said automatic swing door.

6. The object sensor according to claim 4 wherein said light emitter emits a light beam a plural number of times at each door position, and said control unit averages the values of a corresponding number of digital distance signals from said position sensitive device and sets the average value as said reference value for each door position.

7. The object sensor according to claim 4 wherein:

said light emitter emits a light beam a plurality of times at each of said door positions during both of opening and closing strokes of said swing door, and said control unit averages the values of a corresponding number of digital distance signals from said position sensitive device at each door position during each of said opening and closing strokes of said swing door, said control unit averaging again the average for each door position obtained in said opening stroke and the average for the same door position obtained in said closing stroke and setting the resultant average as said reference value for that door position.

8. An object sensing system for use with an automatic swing door, said object sensing system comprising two object sensors as claimed in claim 1 respectively mounted on door surfaces on approach and swing sides of said automatic swing door, said object sensors being arranged to be able to communicate with each other; and a switch provided for each of said object sensors;

that one of said object sensors the switch of which is operated developing a sensor type identification signal indicating a type of said one object sensor, the other of said object sensors receiving said sensor type identification signal transmitted from said one object sensor and identifying a type of said other sensor;

each of said object sensors executing a program corresponding to the type of that object sensor.

9. The object sensing system according to claim 8 wherein said programs corresponding to the respective types of said object sensors are programs for preparing reference value data for use in judging the presence or absence of an object approaching said automatic swing door at each of a plurality of door positions said swing door assumes during operation thereof.

10. The object sensing system according to claim 9 wherein the sensor the switch of which is operated is predetermined to be the sensor mounted on the door surface on the approach side of said automatic swing door.

11. The object sensing system according to claim 9 wherein each of said sensors includes an alarming unit which operates for a predetermined time period following the operation of said switch.

* * * * *